United States Patent
Chang et al.

(10) Patent No.: US 8,294,443 B2
(45) Date of Patent: Oct. 23, 2012

(54) OVERSHOOT/UNDERSHOOT ELIMINATION FOR A PWM CONVERTER WHICH REQUIRES VOLTAGE SLEWING

(75) Inventors: Chiao Chieh Chang, Xinying (TW); Ko-Cheng Wang, Puli Township, Nantou County (TW)

(73) Assignee: Richtek Technology Corp., Chupei, Hsinchu (TW)

( * ) Notice: Subject to any disclaimer, the term of this patent is extended or adjusted under 35 U.S.C. 154(b) by 535 days.

(21) Appl. No.: 12/585,474

(22) Filed: Sep. 16, 2009

(65) Prior Publication Data
US 2010/0066331 A1    Mar. 18, 2010

(30) Foreign Application Priority Data
Sep. 18, 2008    (TW) .............................. 97135862 A

(51) Int. Cl.
*G05F 1/10*    (2006.01)

(52) U.S. Cl. ...................................................... 323/282
(58) Field of Classification Search ........... 323/282–285
See application file for complete search history.

(56) References Cited

U.S. PATENT DOCUMENTS
6,396,326 B1 *   5/2002   Chang ........................... 327/309
* cited by examiner

*Primary Examiner* — Adolf Berhane
*Assistant Examiner* — Yemane Mehari
(74) *Attorney, Agent, or Firm* — Muncy, Geissler, Olds & Lowe, PLLC

(57) ABSTRACT

A level-switching device is coupled to an output node of a PWM converter to switch the output voltage of the PWM converter between two levels by switching a MOS. An undershoot/overshoot eliminator is coupled to the MOS for the MOS changing from totally on state to totally off state or vice versa softly when switching the MOS. The feedback signal transition in the level-switching device becomes slower when switching the MOS to eliminate overshoot/undershoot on the output voltage.

12 Claims, 9 Drawing Sheets

OVERSHOOT/UNDERSHOOT ELIMINATION FOR A PWM CONVERTER WHICH REQUIRES VOLTAGE SLEWING

FIELD OF THE INVENTION

The present invention is related generally to a power converter and, more particularly, to a pulse width modulation (PWM) converter which requires voltage slewing.

BACKGROUND OF THE INVENTION

As shown in FIG. 1, a conventional PWM converter 10 operative to provide an output voltage Vout switchable between two levels includes a power stage 12 driven by a PWM signal to produce an inductor current IL to charge an output capacitor Cout at an output node 16, a control circuit 14 to generate the PWM signal according to a feedback signal VFB at a feedback node 18, a resistor R1 coupled between the output node 16 and a feedback node 18, a resistor R2 coupled between the feedback node 18 and a ground node GND, and a resistor R3 and a switch MS serially coupled between the feedback node 18 and the ground node GND. The feedback signal VFB contains the information of the converter output voltage/current when the PWM converter 10 is enabled. The feedback signal VFB is also one of the parameters which affect the duty-cycle, switching frequency, on-time and off-time of the PWM converter 10. A rapid change of the feedback signal VFB will cause a rapid change of the converter output voltage/current.

FIG. 2 is waveform diagram of the PWM converter 10 shown in FIG. 1 during an up transition of the PWM converter 10, in which waveform 20 represents the feedback signal VFB, waveform 22 represents the output voltage Vout, and waveform 24 represents the inductor current IL. To switch the output voltage Vout from a lower level to a higher level, as shown at time t1, the switch MS is turned on so that the resistor R3 is parallel coupled to the resistor R2. As a result, the feedback signal VFB drops abruptly and instantly, as shown by the waveform 20. When the feedback signal VFB is lower than a reference value, the PWM converter 10 must charge the output capacitor Cout immediately in order to achieve the best output response. Therefore, the PWM converter 10 will charge the output capacitor Cout by its maximum slew-rate, thereby increasing the output voltage Vout as shown by the waveform 22. When the feedback signal VFB catches up the reference value, as shown at time t2, the inductor L gets more energy than steady state. This energy will mainly be transferred to the output node 16, and thereby causes output overshoot.

FIG. 3 is waveform diagram of the PWM converter 10 shown in FIG. 1 during a down transition of the PWM converter 10, in which waveform 30 represents the feedback signal VFB, waveform 32 represents the output voltage Vout, and waveform 34 represents the inductor current IL. The switch MS is switched from on state to off state to switch the output voltage Vout from a higher level to a lower level. In response thereto, the feedback signal VFB jumps abruptly and instantly, as shown at time t3. Consequently, the feedback signal VFB becomes higher than a reference value, and the PWM converter 10 has to discharge the output capacitor Cout. When the feedback signal VFB down close to the reference value, as shown at time t4, the inductor current IL is usually less than the steady state current, and the difference between this inductor current IL and the steady state current will cause undershoot on the output voltage Vout. As shown by FIGS. 2 and 3, an abrupt, rapid change on the feedback signal VFB will make the PWM converter 10 over-react.

Conventionally, the approaches to relieve the overshoot/undershoot of a PWM converter focus on the application circuits. The most commonly used approaches are (a) to lower the inductance, and therefore when doing the transition, there will be less energy stored in the inductor L; (b) to enlarge the output capacitor and thereby get a slow slew rate on the output voltage Vout; and (c) to add low pass filters on the feedback node 18 to prevent rapid feedback signal changes. However, they all rely on adjustments outside the controller chip.

Therefore, it is desired an on-chip undershoot/overshoot eliminator for a PWM converter.

SUMMARY OF THE INVENTION

An object of the present invention is to provide an undershoot/overshoot eliminator for a PWM converter, which changes the feedback signal of the PWM converter softly when switching the output voltage of the PWM converter from a level to another.

Another object of the present invention is to provide a PWM converter having reduced undershoot/overshoot when its output voltage is switched from a level to another.

According to the present invention, an undershoot/overshoot eliminator is coupled to the gate of the MOS switched to switch the output voltage of a PWM converter between two levels, such that the feedback signal transition becomes slower when switching the MOS and therefore, thereby eliminating undershoot/overshoot on the output voltage

BRIEF DESCRIPTION OF THE DRAWINGS

These and other objects, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Figure 1:
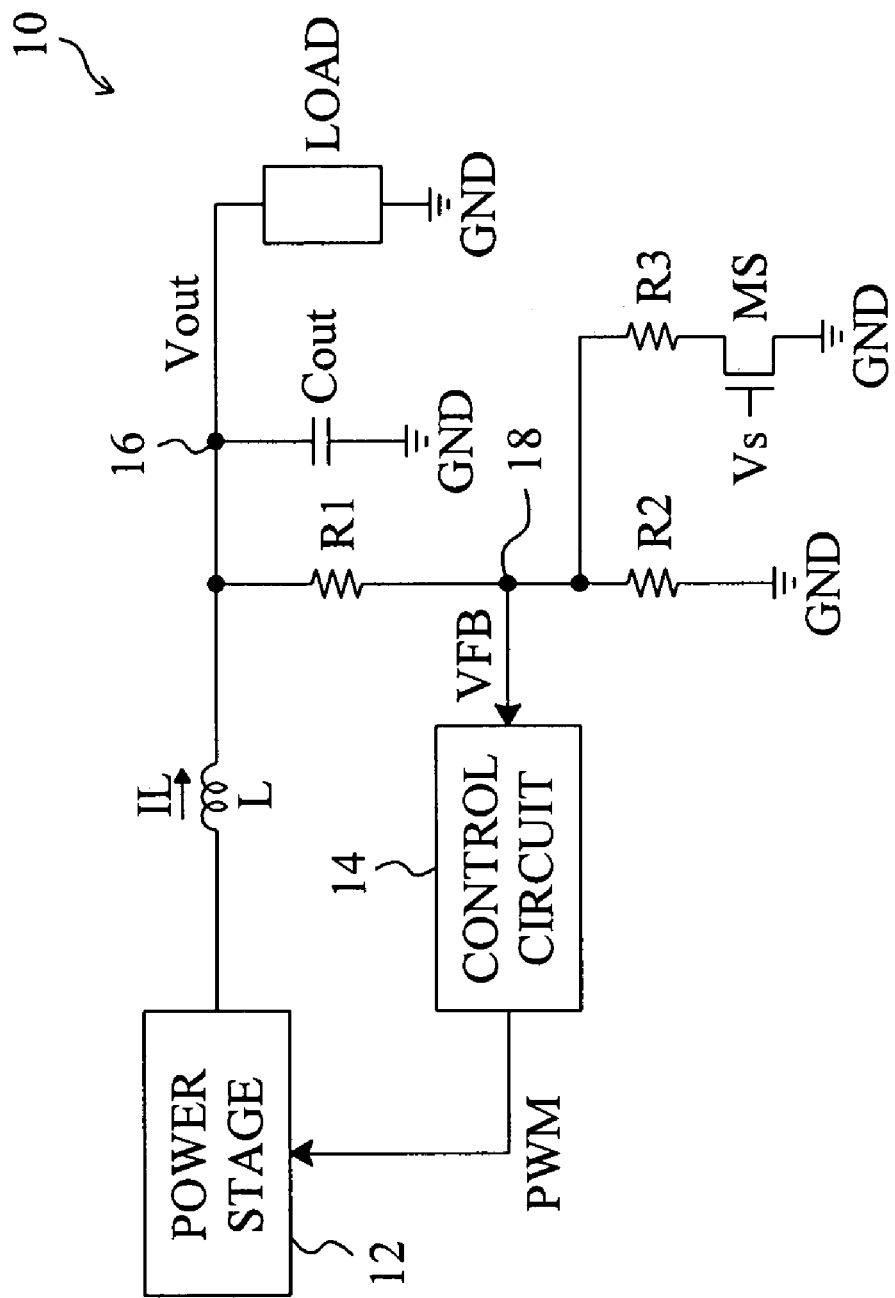
FIG. 1 is a circuit diagram of a conventional PWM converter operative to provide an output voltage Vout switchable between two levels.
Figure 2:
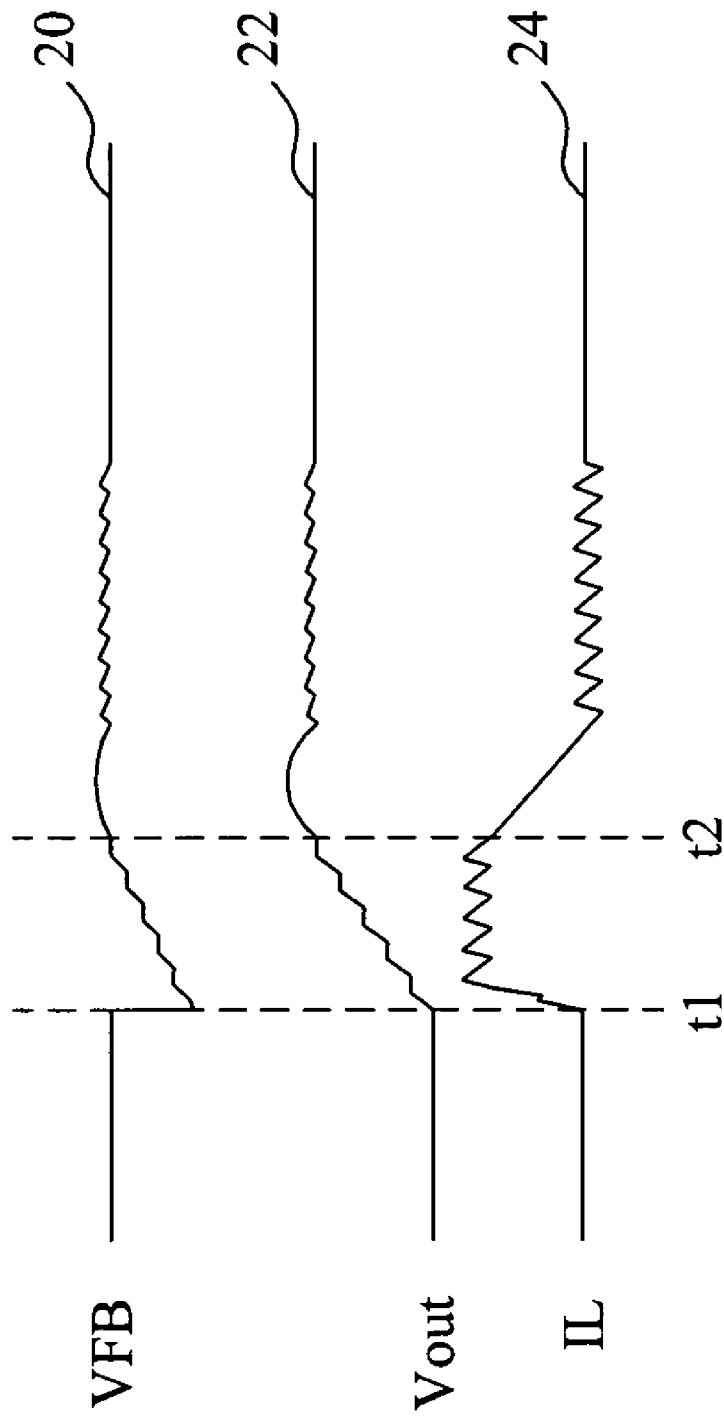
FIG. 2 is a waveform diagram of the PWM converter shown in FIG. 1 during an up transition of the PWM converter.
Figure 3:
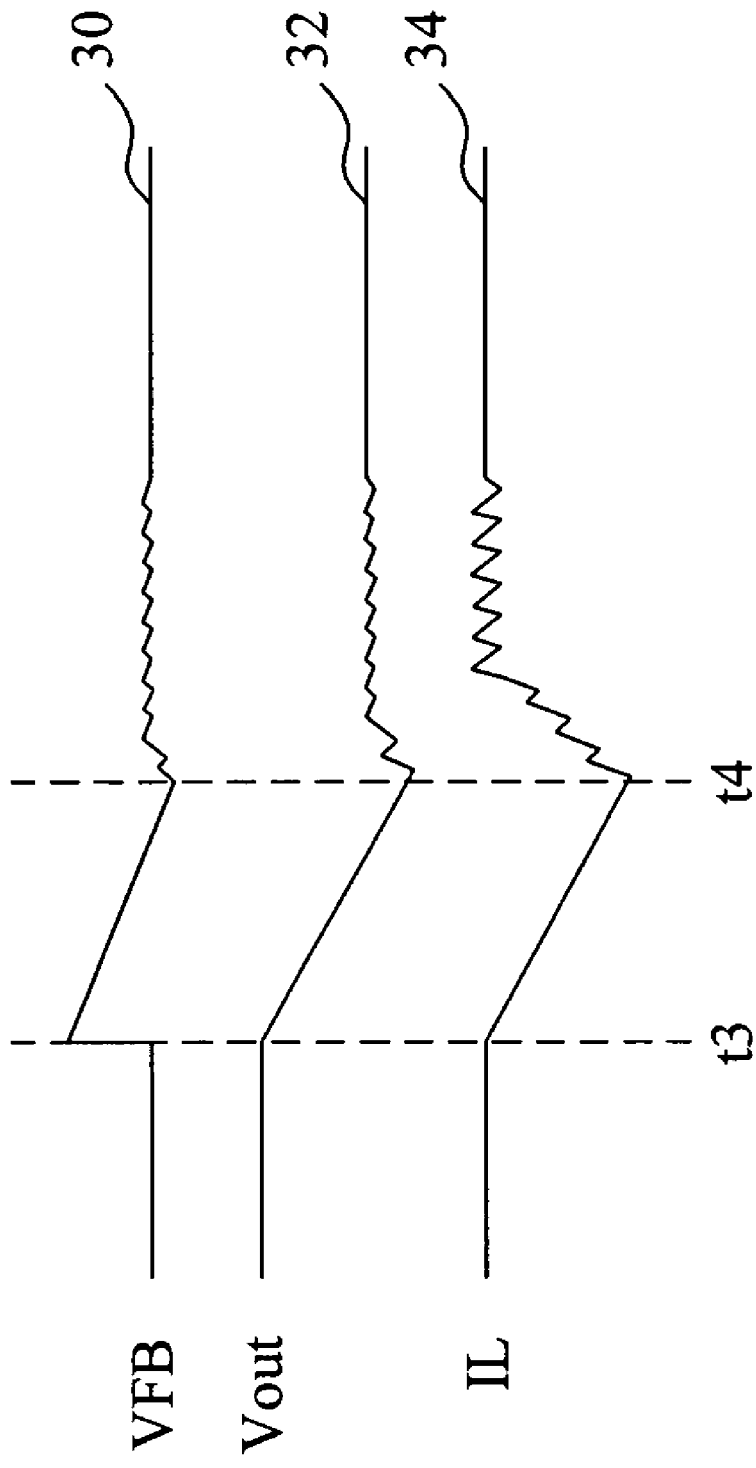
FIG. 3 is a waveform diagram of the PWM converter shown in FIG. 1 during a down transition of the PWM converter.
Figure 4:
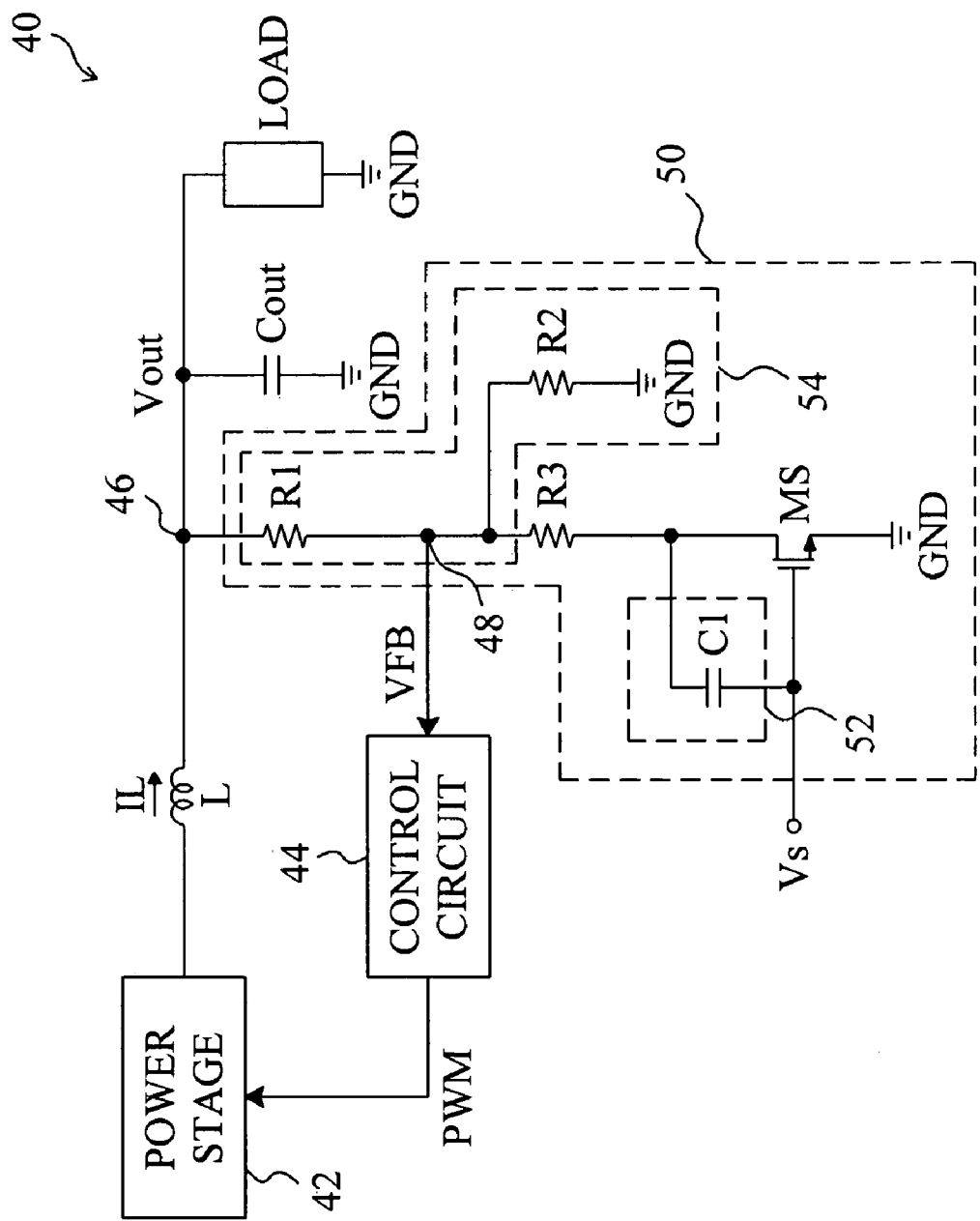
FIG. 4 is a circuit diagram of a first embodiment according to the present invention.

FIG. 4 is a circuit diagram of a first embodiment according to the present invention, based on the PWM converter 10 of FIG. 1. In a PWM converter 40, a power stage 42 is driven by a PWM signal to produce an inductor current IL to charge an output capacitor Cout to provide an output voltage Vout at an output node 46, a control circuit 44 generates the PWM signal according to a feedback signal VFB at a feedback node 48, and resistors R1, R2, R3 and a switch MS are configured as in the PWM converter 10 of FIG. 1A level-switching device 50 including the resistors R1, R2, R3 and switch MS is configured to change the feedback signal VFB softly when switching the output voltage Vout from a level to another. In the level-switching device 50, the resistors R1 and R2 still constitute a voltage divider 54 coupled to the output node 46, the resistor R3 and switch MS are still serially coupled to the feedback node 48 to switch the voltage dividing ratio of the feedback signal VFB to the output voltage Vout, and an undershoot/overshoot eliminator 52 is additionally coupled to the switch MS for soft switching thereof. In this embodiment, the switch MS is an NMOS, and the undershoot/overshoot eliminator 52 includes a capacitor C1 coupled between a drain and a gate of the NMOS MS. This is a simplest method and requires a lowest capacitance value of the capacitor C1 for use of Miller Effect. The capacitor C1 can be integrated inside the controller chip without affecting other components. When the output voltage Vout of the PWM converter 40 is to be switched from a lower level to a higher level, the gate voltage Vs of the NMOS MS should be switched to a high level in order to turn on the NMOS MS. Due to the presence of the capacitor C1, the gate voltage Vs of the NMOS MS will not rise immediately to the high level. In other words, the NMOS MS will change from totally off state to totally on state softly, but not instantly. Therefore, the feedback signal VFB at the feedback node 48 does not fall down abruptly and instantly, and in consequence converter output overshoot is prevented. Likewise, when the output voltage Vout of the PWM converter 40 is to be switched from a higher level to a lower level, the NMOS MS will change from totally on state to totally off state softly due to the capacitor C1, and as a result, converter output undershoot is prevented because the feedback signal VFB at the feedback node 48 does not rise abruptly and instantly.

Figure 5:
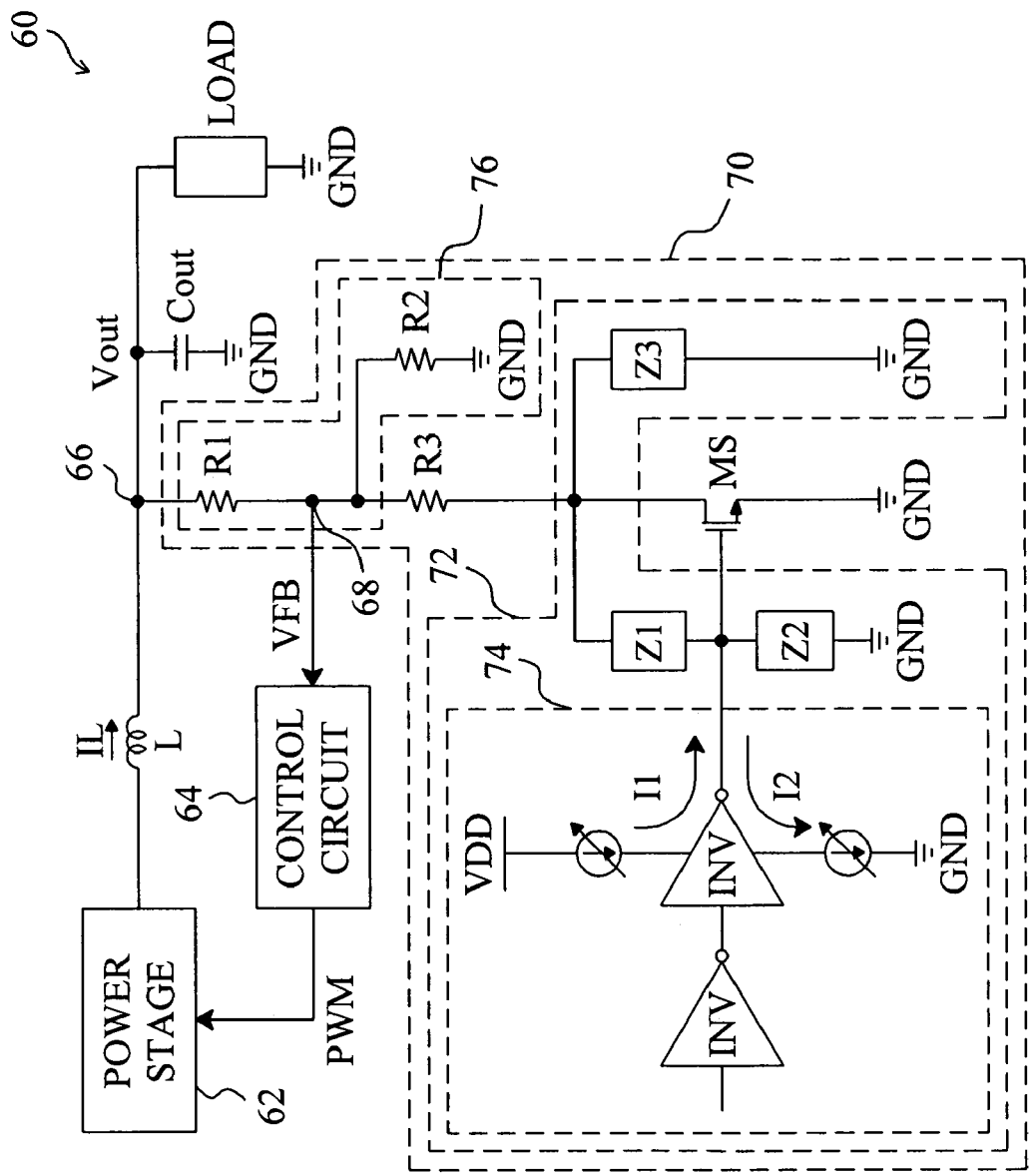
FIG. 5 is a circuit diagram of a second embodiment according to the present invention.

FIG. 5 is a circuit diagram of a second embodiment according to the present invention. In a PWM converter 60, a power stage 62, a control circuit 64, resistors R1, R2, R3 and a switch MS are configured as in that of FIG. 4. In a level-switching device 70, the resistors R1 and R2 constitute a voltage divider 76, the combination of the resistor R3 and switch MS switches the voltage dividing ratio of the feedback signal VFB to the output voltage Vout, and an undershoot/overshoot eliminator 72 is additionally coupled to the switch MS for soft switching thereof. In this embodiment, the switch MS is also an NMOS, and the undershoot/overshoot eliminator 72 includes an impedance network Z1 coupled between a drain and a gate of the NMOS MS, an impedance network Z2 coupled between the gate of the NMOS MS and the ground node GND, an impedance network Z3 coupled between the drain of the NMOS MS and the ground node GND, and a current source 74 coupled to the gate of the NMOS MS to control the turn-on/turn-off behavior of the NMOS through The impedance networks Z1 and Z2. The current source elements in the current source 74 can be variable current sources or constant current sources. The impedance networks Z1, Z2 and Z3 are composed of any resistor, capacitor and inductor by any type topology. Preferably, the impedance network Z1 is a capacitor. The impedance networks Z1, Z2, and Z3 and the current source 74 can be integrated inside the controller chip without affecting other components. When the output voltage Vout of the PWM converter 60 is switched from a lower level to a higher level, the current source 74 sources a current I1 to the gate of the NMOS MS to turn on the NMOS MS. Due to the impedance networks Z1, Z2 and Z3, the NMOS MS changes softly but not instantly from totally off state to totally on state. In consequence, the feedback signal VFB at the feedback node 68 does not fall down abruptly and instantly, and converter output overshoot is prevented. Similarly, when the output voltage Vout of the PWM converter 60 is switched from a higher level to a lower level, the current source 74 sinks a current I2 from the gate of the NMOS MS, and due to the impedance networks Z1, Z2 and Z3, the NMOS MS changes softly from totally on state to totally off state. Therefore, the feedback signal VFB at the feedback node 68 does not rise abruptly and instantly, and converter output undershoot is prevented.

Figure 6:
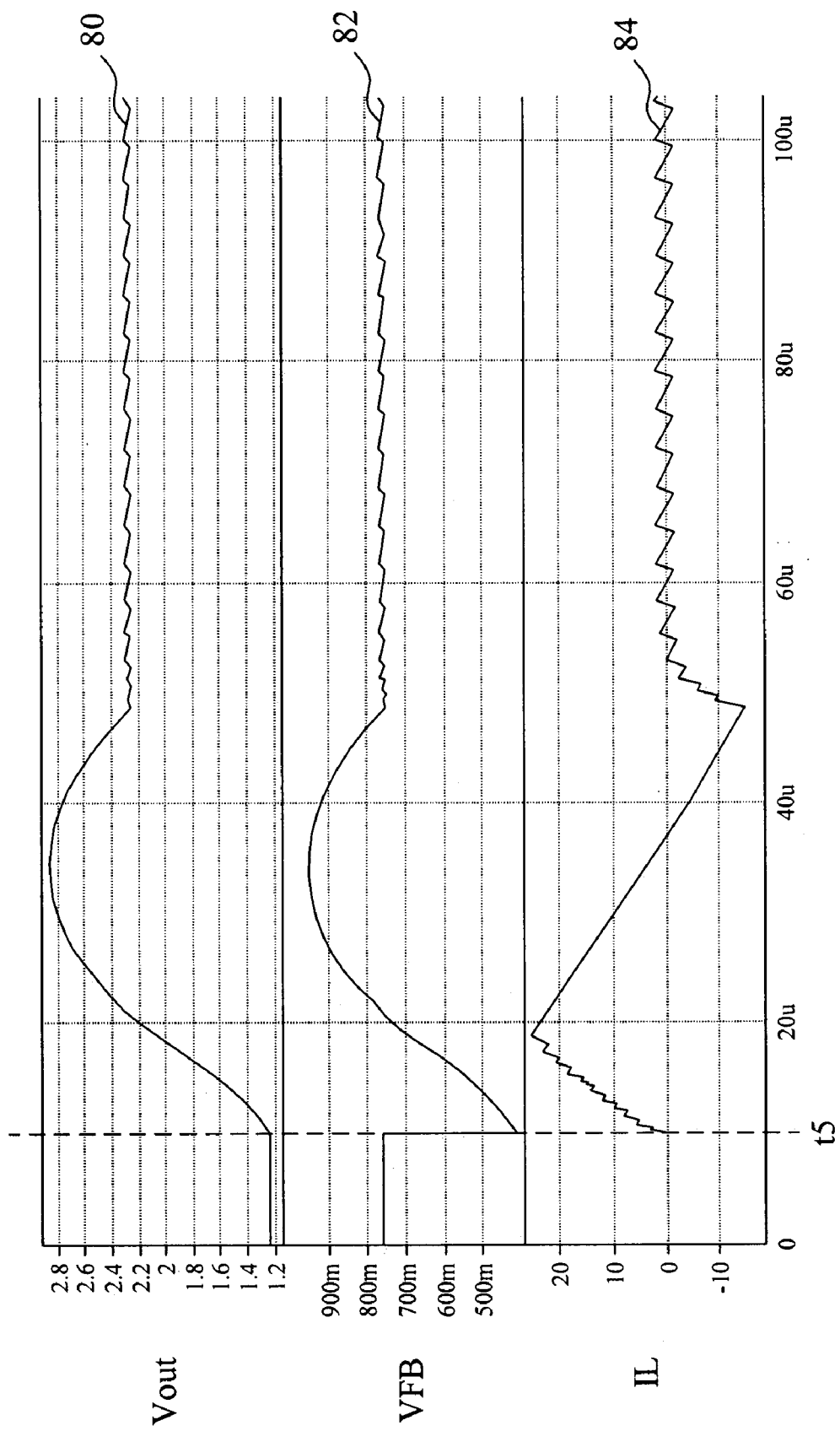
FIG. 6 is a waveform diagram of a PWM converter without the undershoot/overshoot eliminator according to the present invention during an up transition of the PWM converter in a simulation.
Figure 7:
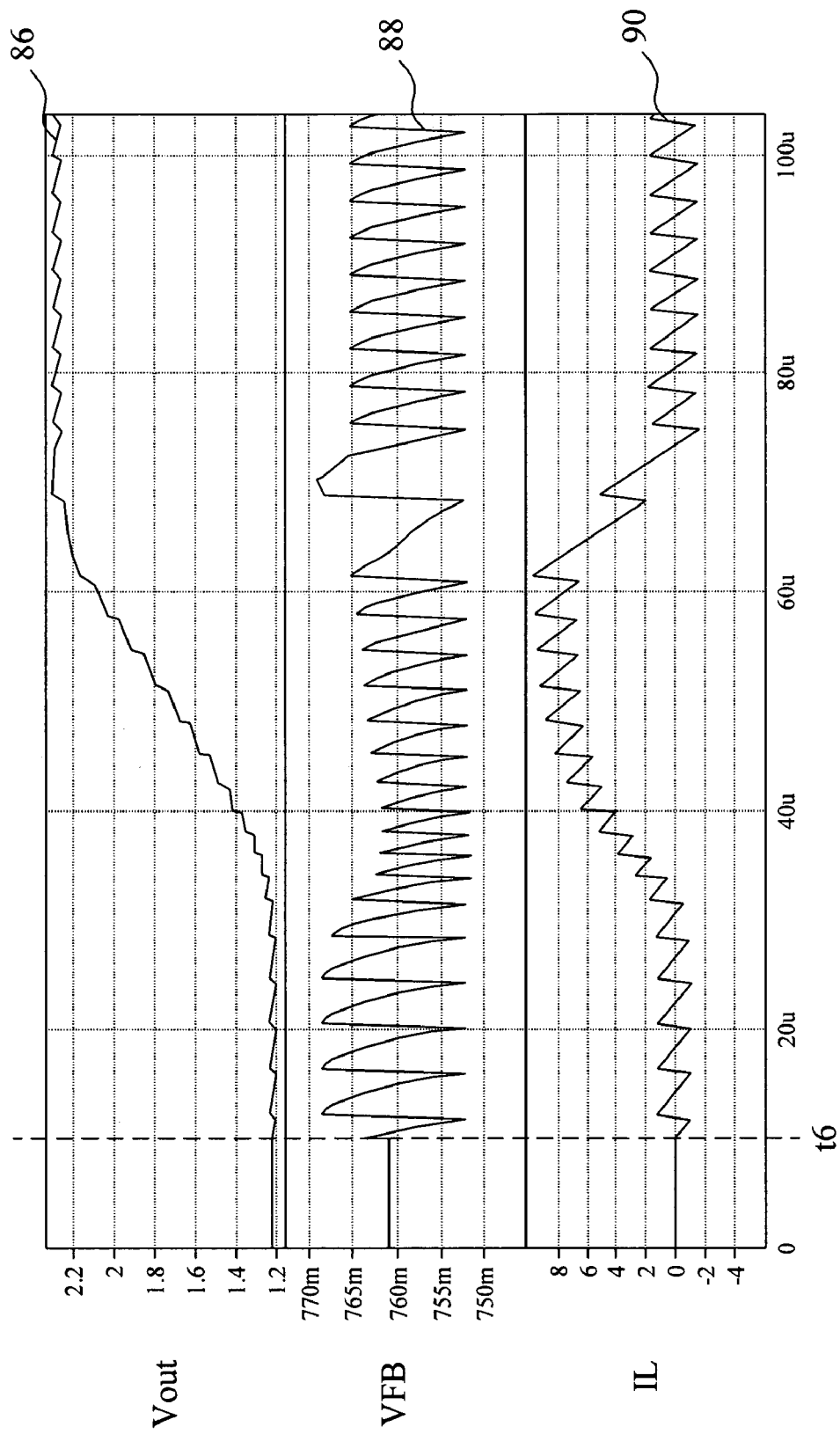
FIG. 7 is a waveform diagram of a PWM converter with the undershoot/overshoot eliminator according to the present invention during an up transition of the PWM converter in a simulation.

FIG. 6 is a waveform diagram of a PWM converter without the undershoot/overshoot eliminator according to the present invention during an up transition of the PWM converter in a simulation, and FIG. 7 is a waveform diagram of a PWM converter with the undershoot/overshoot eliminator according to the present invention during an up transition of the PWM converter in a simulation, in which waveforms 80 an 86 represent the output voltage Vout, waveforms 82 and 88 represent the feedback signal VFB, and waveforms 84 and 90 represent the inductor current IL. Referring to FIG. 6, during the up transition, as shown at time t5, the feedback signal VFB drops down abruptly and instantly as shown by the waveform 82, so that the inductor current IL rises rapidly as shown by the waveform 84, and in consequence the output voltage Vout overshoots as shown by the waveform 80. Referring to FIG. 7, with the undershoot/overshoot eliminator according to the present invention, during the up transition, as shown at time t6, the feedback signal VFB does not fall down abruptly and instantly, as shown by the waveform 88, and the average of the feedback signal VFB changes slowly. Thus, the inductor current IL does not rise significantly, as shown by the waveform 90, and the output voltage Vout does not overshoot, as shown by the waveform 86.

Figure 8:
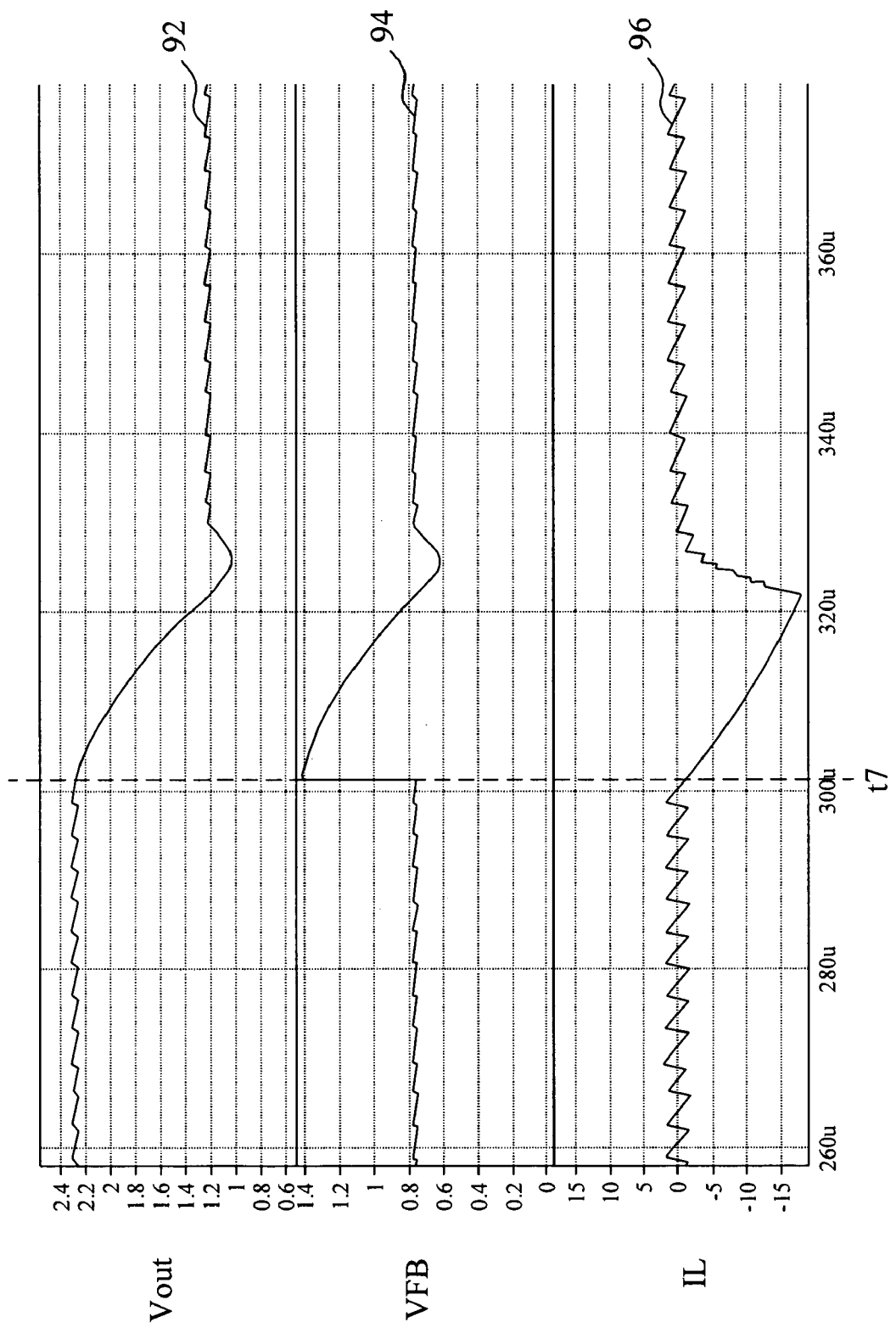
FIG. 8 is a waveform diagram of a PWM converter without the undershoot/overshoot eliminator according to the present invention during a down transition of the PWM converter in a simulation.
Figure 9:
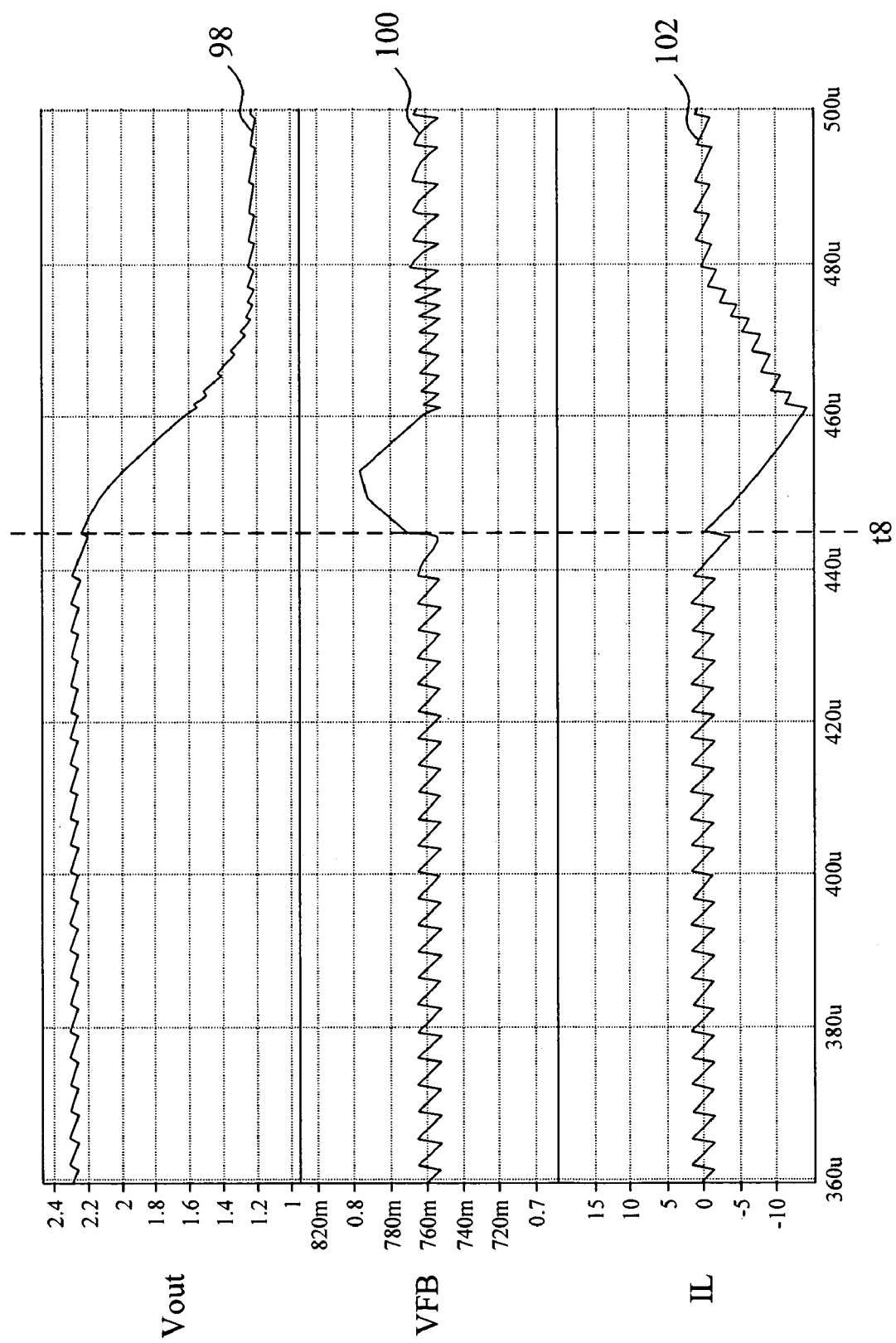
FIG. 9 is a waveform diagram of a PWM converter with the undershoot/overshoot eliminator according to the present invention during a down transition of the PWM converter in a simulation.

FIG. 8 is a waveform diagram of a PWM converter without the undershoot/overshoot eliminator according to the present invention during a down transition of the PWM converter in a simulation, and FIG. 9 is a waveform diagram of a PWM converter with the undershoot/overshoot eliminator according to the present invention during a down transition of the PWM converter in a simulation, in which waveforms 92 and 98 represent the output voltage Vout, waveform 94 and 100 represent the feedback signal VFB, and waveforms 96 and 102 represent the inductor current IL. Referring to FIG. 8, during the down transition, as shown at time t7, the feedback signal VFB rises abruptly and instantly, as shown by the waveform 94. Therefore, as shown by the waveform 96, the inductor current IL drops down rapidly and leads to undershoot of the output voltage Vout, as shown by the waveform 92. Referring to FIG. 9, with the undershoot/overshoot eliminator according to the present invention, during the down transition, the feedback signal VFB does not rise abruptly and instantly, as shown by the waveform 100, and the feedback signal VFB changes softly. In consequence, the inductor current IL does not fall significantly, as shown by the waveform 102, and the output voltage Vout does not undershoot, as shown by the waveform 98.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A level-switching device for a PWM converter, comprising:
   a voltage divider coupled to an output node of the PWM converter to generate a feedback signal related to an output voltage at the output node, and having a feedback node to provide the feedback signal;
   a resistor and a MOS serially coupled to the feedback node to switch a voltage dividing ratio of the signal VFB to the output voltage; and
   an undershoot/overshoot eliminator coupled to the MOS for the MOS changing from a totally on state to a totally off state or vice versa softly when switching the MOS, the undershoot/overshoot eliminator comprising:
   a first impedance network coupled between a drain and a gate of the MOS;
   a second impedance network coupled between the gate of the MOS and a ground node;
   a third impedance network coupled between the drain of the MOS and the ground node; and
   a current source coupled to the gate of the MOS for controlling turning-on/turning-off of the MOS.

2. The level-switching device of claim 1, wherein the voltage divider comprises:
   a second resistor coupled between the output node and the feedback node; and
   a third resistor coupled between the feedback node and a ground node.

3. The level-switching device of claim 1, wherein the undershoot/overshoot eliminator comprises a capacitor coupled between a drain and a gate of the MOS.

4. The level-switching device of claim 1, wherein the first impedance network comprises a capacitor coupled between the drain and the gate of the MOS.

5. The level-switching device of claim 1, wherein the current source comprises a variable current source.

6. The level-switching device of claim 1, wherein the current source comprises a constant current source.

7. A PWM converter, comprising:
   a power stage driven by a PWM signal to produce an inductor current to charge an output capacitor at an output node to thereby provide an output voltage;
   a voltage divider coupled to the output node to divide the output voltage to generate a feedback signal at a feedback node;
   a resistor and a MOS serially coupled to the feedback node to switch a voltage dividing ratio of the signal VFB to the output voltage;
   an undershoot/overshoot eliminator coupled to the MOS for the MOS changing from a totally on state to a totally off state or vice versa softly when switching the MOS, the undershoot/overshoot eliminator comprising:
   a first impedance network coupled between a drain and a gate of the MOS:
   a second impedance network coupled between the gate of the MOS and a ground node;
   a third impedance network coupled between the drain of the MOS and the ground node; and
   a current source coupled to the gate of the MOS for controlling turning-on/turning-off of the MOS; and
   a control circuit coupled to the feedback node to generate the PWM signal according to the feedback signal.

8. The PWM converter of claim 7, wherein the voltage divider comprises:
   a second resistor coupled between the output node and the feedback node; and
   a third resistor coupled between the feedback node and a ground node.

9. The PWM converter of claim 7, wherein the undershoot/overshoot eliminator comprises a capacitor coupled between a drain and a gate of the MOS.

10. The PWM converter of claim 7, wherein the first impedance network comprises a capacitor coupled between the drain and the gate of the MOS.

11. The PWM converter of claim 7, wherein the current source comprises a variable current source.

12. The PWM converter of claim 7, wherein the current source comprises a constant current source.

* * * * *